(12) United States Patent
Prabhavalkar et al.

(10) Patent No.: US 11,145,293 B2
(45) Date of Patent: Oct. 12, 2021

(54) SPEECH RECOGNITION WITH SEQUENCE-TO-SEQUENCE MODELS

(71) Applicant: Google LLC, Mountain View, CA (US)

(72) Inventors: Rohit Prakash Prabhavalkar, Santa Clara, CA (US); Zhifeng Chen, Sunnyvale, CA (US); Bo Li, Fremont, CA (US); Chung-Cheng Chiu, Sunnyvale, CA (US); Kanury Kanishka Rao, Santa Clara, CA (US); Yonghui Wu, Fremont, CA (US); Ron J. Weiss, New York, NY (US); Navdeep Jaitly, Mountain View, CA (US); Michiel A. U. Bacchiani, Summit, NJ (US); Tara N. Sainath, Jersey City, NJ (US); Jan Kazimierz Chorowski, Poland (PL); Anjuli Patricia Kannan, Berkeley, CA (US); Ekaterina Gonina, Sunnyvale, CA (US); Patrick An Phu Nguyen, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 210 days.

(21) Appl. No.: 16/516,390

(22) Filed: Jul. 19, 2019

(65) Prior Publication Data
US 2020/0027444 A1   Jan. 23, 2020

Related U.S. Application Data

(60) Provisional application No. 62/701,237, filed on Jul. 20, 2018.

(51) Int. Cl.
| | | |
|---|---|---|
| G10L 15/00 | (2013.01) | |
| G10L 15/16 | (2006.01) | |
| G10L 15/22 | (2006.01) | |
| G10L 15/02 | (2006.01) | |
| G06N 3/08 | (2006.01) | |
| G10L 15/06 | (2013.01) | |
| G10L 25/30 | (2013.01) | |
| G10L 15/26 | (2006.01) | |

(52) U.S. Cl.
CPC ............ *G10L 15/16* (2013.01); *G06N 3/08* (2013.01); *G10L 15/02* (2013.01); *G10L 15/063* (2013.01); *G10L 15/22* (2013.01); *G10L 25/30* (2013.01); *G10L 15/26* (2013.01); *G10L 2015/025* (2013.01)

(58) Field of Classification Search
CPC combination set(s) only.
See application file for complete search history.

*Primary Examiner* — Vu B Hang
(74) *Attorney, Agent, or Firm* — Honigman LLP; Brett A. Krueger

(57) ABSTRACT

Methods, systems, and apparatus, including computer-readable media, for performing speech recognition using sequence-to-sequence models. An automated speech recognition (ASR) system receives audio data for an utterance and provides features indicative of acoustic characteristics of the utterance as input to an encoder. The system processes an output of the encoder using an attender to generate a context vector and generates speech recognition scores using the context vector and a decoder trained using a training process that selects at least one input to the decoder with a predetermined probability. An input to the decoder during training is selected between input data based on a known value for an element in a training example, and input data based on an output of the decoder for the element in the training example. A transcription is generated for the utterance using word elements selected based on the speech recognition scores. The transcription is provided as an output of the ASR system.

20 Claims, 6 Drawing Sheets

SPEECH RECOGNITION WITH SEQUENCE-TO-SEQUENCE MODELS

CROSS-REFERENCE TO RELATED APPLICATIONS

This application claims priority under 35 USC § 119(e) to U.S. Patent Application Ser. No. 62/701,237, filed on Jul. 20, 2018. The entire contents of U.S. Patent Application Ser. No. 62/701,237 are hereby incorporated by reference.

FIELD

The present specification is related to speech recognition.

BACKGROUND

In general, speech recognition systems can use a neural network model that performs speech enhancement and acoustic modeling. Some systems process audio data from multiple input sources using a neural network.

SUMMARY

Various techniques for enhancing speech recognition accuracy are disclosed below. Some implementations involve enhanced listen, attend, and spell (LAS) models, and others involve neural transducer models. Both types of models can use an attention mechanism, e.g., an attention neural network between an encoder and decoder, and can achieve high accuracy in recognizing speech.

An attention-based model can be used for sequence-to-sequence speech recognition. In some implementations, the model provides end-to-end speech recognition and integrates acoustic, pronunciation, and language models into a single neural network, and does not require a lexicon or a separate text normalization component. Various structures and optimization mechanisms can provide increased accuracy and reduced model training time. Structural improvements include the use of word piece models, which can allow the model to output different types of linguistic units, from single graphemes up to whole words. Another structural improvement includes the use of multi-headed attention processing that enables multiple attention distributions to be generated for the same encoder outputs. Optimizations to training include the use of minimum word-error-rate training criteria, scheduled sampling, synchronous training, and label smoothing. Language model rescoring can be used to obtain further improvements in model prediction accuracy.

Attention-based encoder-decoder architectures such as Listen, Attend, and Spell (LAS), subsume the acoustic, pronunciation and language model components of a traditional automatic speech recognition (ASR) system into a single neural network. In some implementations, such architectures are comparable to state-of-the-art ASR systems on dictation tasks, but it was not clear if such architectures would be practical for more challenging tasks such as voice search. This document describes a variety of structural and optimization improvements to an LAS model which can significantly improve performance. On the structural side, it is shown that word piece models can be used instead of graphemes. This document introduces a multi-head attention architecture, which offers improvements over the commonly-used single-head attention. On the optimization side, techniques are described such as synchronous training, scheduled sampling, label smoothing, and minimum word error rate optimization, which are all shown to improve accuracy. Results are presented with a unidirectional long short-term memory (LSTM) encoder for streaming recognition. On a 12,500 hour voice search task, the proposed changes improve the WER of the LAS system from 9.2% to 5.6%, while the best conventional system achieves a 6.7% WER. Both models are tested on a dictation dataset, and the described model provides 4.1% WER while the conventional system provides 5% WER.

Sequence-to-sequence models that can operate in an online fashion can also provide improvements to streaming applications such as Voice Search. Some sequence-to-sequence models experience degraded performance when used for streaming applications. For example, a neural transducer (NT) is a streaming sequence-to-sequence model that may show degraded performance compared to non-streaming models such as Listen, Attend and Spell (LAS). In this context, this document describes techniques for achieving various improvements to a NT model. The described techniques include increasing the window over which NT computes attention. For example, the window can be increased by looking backwards in time so the model still remains online. The described techniques further include initializing an NT model from a LAS-trained model so that the NT model is guided with a better alignment. Other improvements to the NT model involve using stronger language models (LM), such as word-piece models, and applying an external LM during a beam search. The achieved improvements enable an NT model to match the performance of LAS during an example voice search task. Matching the high level of performance of LAS models with an NT model is a significant improvement, since the NT model can provide this level of accuracy with low latency (e.g., providing streaming results with latency of 500 ms or less), while the LAS model typically must receive an entire utterance before outputting a prediction.

One aspect of the subject matter described in this specification can be embodied in a method performed by one or more computers of an automated speech recognition system. The method includes receiving audio data for an utterance, providing features indicative of acoustic characteristics of the utterance as input to an encoder neural network, and processing an output of the encoder neural network using an attender neural network to generate a context vector. The method also includes generating speech recognition scores using the context vector and a decoder neural network. The decoder neural network has been trained using a training process that selects at least one input to the decoder neural network with a predetermined probability, wherein the at least one input to the decoder neural network during training is selected between (i) input data based on a known value for an element in a training example, and (ii) input data based on an output of the decoder neural network for the element in the training example. The method includes generating a transcription for the utterance using word elements selected based on the speech recognition scores. The method includes providing the transcription as an output of the automated speech recognition system.

These and other implementations can each optionally include one or more of the following features. For example, in some implementations, the element in the training example is an element for a most-recent previous output time step, wherein the known value is a ground-truth output label for the element in the training example, and wherein the prediction for the element in the training example is an output label predicted using output of the decoder neural network for a most-recent previous output time step.

In some implementations, the context vector is a weighted sum of multiple encoder outputs for the utterance. In some implementations, the attender neural network has multiple different network components that each receive the output of the encoder neural network. In some implementations, wherein the decoder neural network is configured to generate word element scores indicating likelihoods for a set of word elements that includes individual graphemes.

In some implementations, the set of word elements for which the decoder neural network is configured to generate word element scores further includes whole words. In some implementations, the word elements are position-dependent, and one or more of the word elements include a word separator marker to denote a word boundary.

In some implementations, the encoder neural network, the attender neural network, and the decoder neural network form a sequence-to-sequence model that performs acoustic modelling, pronunciation modelling, and language modelling independent of other models.

In some implementations, the automated speech recognition system is configured to generate a transcription for the utterance using the sequence-to-sequence model without finite state transducers, a lexicon, or a text normalization module.

In some implementations, the attender neural network implements a multi-headed attention mechanism that generates multiple attention distributions; and each of the multiple different network components of the attender neural network separately receives and processes the output of the encoder neural network to independently generate one of the multiple attention distributions.

In some implementations, processing the output of the encoder neural network using an attender neural network to generate the attention distribution comprises: normalizing each of the multiple attention distributions determined by the multiple different network components of the attender neural network; and averaging the normalized distributions to generate the attention distribution of the attender neural network that is processed by the decoder neural network.

In some implementations, each of the multiple different network components of the attender neural network receives the entire set of output of the encoder neural network as input, and each of the multiple different network components of the attender neural network applies a different set of weights to the output of the encoder neural network.

In some implementations, the attention distribution has a lower dimensionality than the output of the encoder neural network.

In some implementations, the decoder neural network is a recurrent neural network comprising long short-term memory (LSTM) elements.

In some implementations, generating the transcription for the utterance comprises using beam search processing to generate one or more candidate transcriptions based on the word element scores.

In some implementations, generating a transcription for the utterance comprises: generating language model scores for the multiple candidate transcriptions using a language model; and determining the transcription based on the language model scores generated using the language model.

In some implementations, generating language model scores for the multiple candidate transcriptions comprises determining the language model scores using a plurality of domain-specific language models that are combined using Bayesian interpolation.

In some implementations, determining the transcription based on the language model scores generated using the language model comprises generating a combined score that represents a log-linear interpolation of scores based on the output of the decoder neural network and the language model scores determined using the language model.

In some implementations, the combined score for a candidate transcription is further based on a scoring factor based on the number of words in the candidate transcription and an empirically tuned coefficient.

In some implementations, the decoder neural network comprises a unidirectional LSTM neural network; providing features indicative of acoustic characteristics of the utterance as input to an encoder neural network comprises providing a series of features vectors that represents the entire utterance, the encoder neural network being configured to generate output encodings in a streaming manner as the feature vectors are input; and generating word element scores using a decoder neural network comprises beginning decoding of word elements representing the utterance after the encoder neural network has completed generating output encodings for each of the feature vectors in the series of features vectors that represents the entire utterance.

Another aspect of the subject matter described in this specification can be embodied in a method performed by one or more computers of an automated speech recognition system. The method includes: accessing training data indicating utterances and transcriptions for the utterances; generating a speech recognition model comprising an encoder neural network, an attender neural network, and a decoder neural network; training the speech recognition model using a loss function having a minimum word error rate criterion; providing the trained speech recognition model for generating use in generating transcriptions for audio data indicating characteristics of utterances.

These and other implementations can each optionally include one or more of the following features. For example, in some implementations, training the speech recognition model using the loss function having a minimum word error rate criterion comprises determining a word error rate expectation for a training example using sampling.

In some implementations, training the speech recognition model using the loss function having a minimum word error rate criterion comprises determining a word error rate expectation for a training example by: determining, based on output of the speech recognition model in response to processing of input data for the training example, a set of hypotheses using beam search decoding; identifying an n-best list of hypotheses based on probabilities indicated by the output of the speech recognition model; limiting evaluation for the word error rate expectation to the n-best list of decoded hypotheses; and approximating the word error rate expectation by weighting a measure of errors in each hypothesis by an amount of the probability distribution that the output of the speech recognition model concentrates on the hypothesis.

In some implementations, the loss function interpolates minimum word error rate with cross-entropy based loss.

In some implementations, training the speech recognition model comprises smoothing a distribution of labels for training examples with a uniform distribution over all labels to increase entropy of predictions from the speech recognition model.

In some implementations, training the speech recognition model comprises training the decoder neural network using scheduled sampling.

In some implementations, the decoder neural network is configured to receive input representing a previous prediction of the decoder neural network; and training the decoder neural network using scheduled sampling comprises, for at least some training examples: using output that the decoder neural network provided during training in the previous prediction to determine a label; and providing data indicating the determined label as input to the decoder neural network for training for determining a subsequent label.

In some implementations, the decoder neural network is configured to receive input representing a previous prediction of the decoder neural network; and training the decoder neural network using scheduled sampling comprises varying the input that the decoder neural network receives between (i) data that represents a word element determined from the previous prediction of the decoder neural network during training or (ii) data representing a correct prior word element.

In some implementations, varying the input that the decoder neural network receives comprises determining, for each training step representing a prediction during a training process, whether to provide input to the decoder neural network based on the previous prediction or based on a correct prior word element, the determination being made according to a sampling rate that represents a probability of selecting the previous prediction, wherein the sampling rate is gradually increased over at least a portion of the training of the decoder neural network.

In some implementations, the sampling rate is increased linearly over an initial portion of the training of the decoder neural network to a maximum value of the sampling rate that is maintained after a predetermined number of training steps are completed.

In some implementations, training the speech recognition model comprises using synchronous training in which multiple model replicas are trained in parallel and adjustments to the parameters of the model replicas are combined synchronously.

In some implementations, the parameters of the model replicas are combined synchronously after each of the model replicas have each completed parameter adjustments corresponding to predetermined batches of training examples or a predetermined number of training steps.

In some implementations, a degree of parameter adjustment during training is controlled by a learning rate, and the learning rate is increased over the course of training.

In some implementations, training the speech recognition model comprises tracking a moving average of a gradient norm of the speech recognition model during training, and discarding gradients having a variance higher than the moving average by at least a threshold amount.

In some implementations, analysis of gradients with respect to the moving average is performed for each training iteration or each training sample.

In some implementations, training the speech recognition model comprises training the speech recognition model using a token-level loss function corresponding to accuracy of sub-word unit prediction and a word-level loss function corresponding to accuracy of whole word prediction.

In some implementations, training the speech recognition model comprises training the speech recognition model using a loss function that includes token-level loss component and a word-level loss component, or varying between token level loss criteria and word-level loss criteria over the course of training.

Another aspect of the subject matter described in this specification can be embodied in a method performed by one or more computers of an automated speech recognition system. The method includes: receiving audio data for an utterance; providing features indicative of acoustic characteristics of the utterance as input to a sequence-to-sequence neural network speech recognition model, the speech recognition model comprising an encoder, an attender, and a decoder, wherein the attender is configured to limit attention to a fixed-size sequence of outputs from the encoder, wherein the decoder is configured to provide streaming speech recognition results while audio data of an utterance is still being received and without waiting for the utterance to be completed; receiving word element scores as outputs of the speech recognition model, the word element scores indicating likelihoods for sub-word units; generating a transcription for the utterance using word elements selected based on the word element scores output by the decoder neural network; and providing the transcription as an output of the automated speech recognition system.

These and other implementations can each optionally include one or more of the following features. For example, in some implementations, the speech recognition model is configured to generating an output at the decoder based on input data representing no more than 300 ms of an utterance.

In some implementations, generating the transcription for the utterance comprises using beam search decoding to generate one or more candidate transcriptions based on the word element scores.

In some implementations, generating a transcription for the utterance comprises: generating language model scores for the multiple candidate transcriptions using a language model; and determining the transcription based on the language model scores generated using the language model.

In some implementations, determining the transcription based on the language model scores generated using the language model comprises generating a combined score that represents a log-linear interpolation of scores based on the output of the decoder neural network and the language model scores determined using the language model.

In some implementations, the combined score for a candidate transcription is further based on a scoring factor configured to promote longer transcriptions, the scoring factor being based on a measure of a length of the candidate transcription weighted by an empirically tuned coefficient.

In some implementations, the sub-word units are graphemes.

In some implementations, the sub-word units are longer than individual graphemes but less than full words.

In some implementations, the word elements are position-dependent, and one or more of the word elements include a word separator marker to denote a word boundary.

In some implementations, the method includes: determining, from the audio data for the utterance, speech frames each representing audio characteristics over different periods having a same duration; successively processing chunks that each include different sets of speech frames with the speech recognition model, wherein the speech recognition model is configured to predict a variable number of word elements for each chunk processed, wherein each chunk corresponds to a time step of processing of the speech recognition model, each chunk comprising a same predetermined number of speech frames, each chunk having a first predetermined number of speech frames representing speech occurring before speech content being predicted at the current time step and a second predetermined number of speech frames representing speech occurring after the speech content being predicted in the current time step.

In some implementations, the attender of the speech recognition model is configured to compute attention based speech frames in the current chunk and one or more previous chunks of the utterance.

In some implementations, the attender is configured to compute attention based on speech frames in the current chunk and at least 10 previous chunks of the utterance.

In some implementations, the speech recognition model is configured to output at least one probability distribution for each chunk, wherein the probability distribution can indicate an element that does not correspond to a word element as a most likely prediction.

In some implementations, the speech recognizer is a neural transducer speech recognition model.

In some implementations, the method includes: training a listen, attend, and spell (LAS) speech recognition model; initializing the neural transducer speech recognition model based on the trained LAS model; and training the neural transducer speech recognition model that has been initialized based on the trained LAS model.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
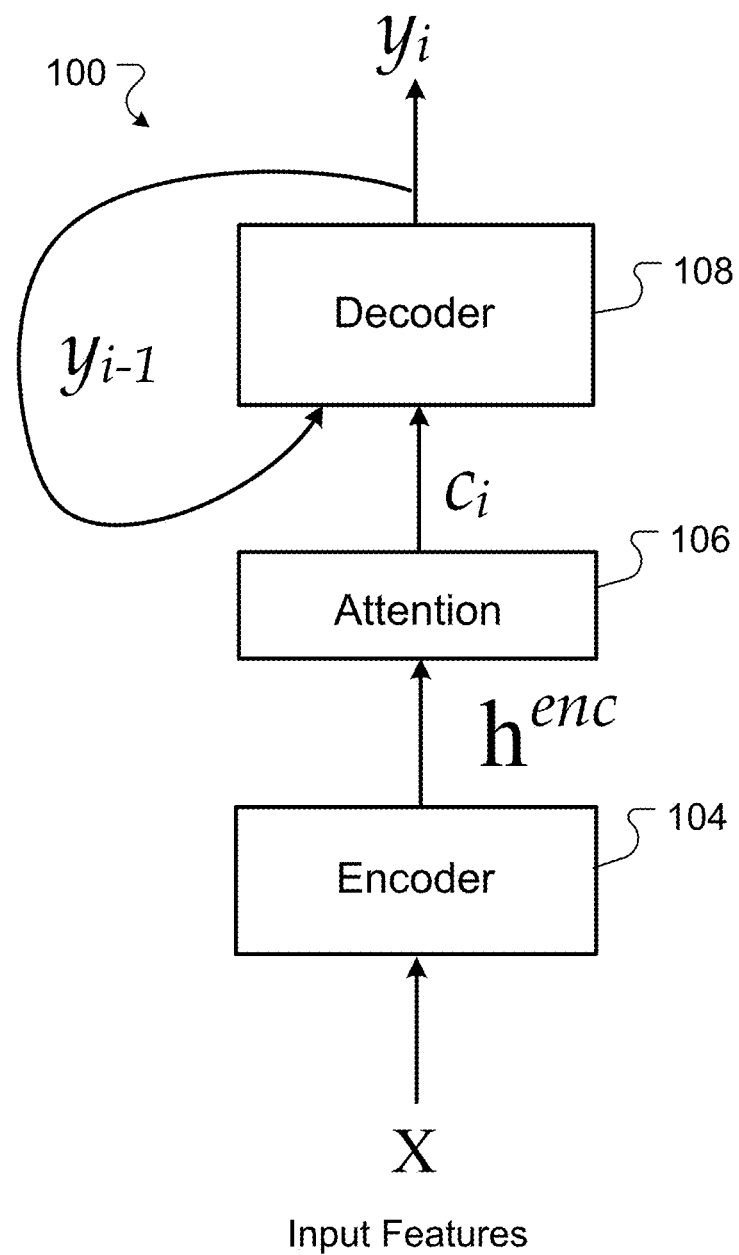
FIG. 1 is a diagram showing an example model that includes an attention-based encoder-decoder architecture for performing speech recognition.

Sequence-to-sequence models have been gaining in popularity in the automatic speech recognition (ASR) community as a way of folding separate acoustic models, pronunciation models, and language models of a conventional ASR system into a single neural network. A variety of sequence-to-sequence models have been explored, including Recurrent Neural Network Transducer (RNN-T), Listen, Attend and Spell (LAS), Neural Transducer, Monotonic Alignments and Recurrent Neural Aligner (RNA). While these models have shown promising results, thus far, it is not clear if such approaches would be practical to unseat the current state-of-the-art, hidden Markov model (HMM)-based neural network acoustic models, which are combined with a separate pronunciation model (PM) and language model (LM) in a conventional system. Such sequence-to-sequence models are fully neural, without finite state transducers, a lexicon, or text normalization modules. Training such models is simpler than conventional ASR systems: they do not require bootstrapping from decision trees or time alignments generated from a separate system. To date, however, none of these models have been able to outperform a state-of-the art ASR system on a large vocabulary continuous speech recognition (LVCSR) task. This document explores the various structure and optimization improvements to allow sequence-to-sequence models to significantly outperform a conventional ASR system on a voice search task.

LAS can provide improvements over other sequence-to-sequence models, and this document describes improvements to the LAS model. The LAS model is a single neural network that includes an encoder which is analogous to a conventional acoustic model, an attender that acts as an alignment model, and a decoder that is analogous to the language model in a conventional system. Modifications to both the model structure, as well as in the optimization process, are considered. On the structure side, first, word piece models (WPM) are explored which have been applied to machine translation and more recently to speech in RNN-T and LAS. Graphemes and WPM are compared for LAS, and modest improvements are found with WPM. Next, incorporating multi-head attention is explored, which allows the model to learn to attend to multiple locations of the encoded features. Overall, there is 13% relative improvement in WER with these structure improvements.

On the optimization side, a variety of strategies are explored as well. Conventional ASR systems benefit from discriminative sequence training, which optimizes criteria more closely related to WER. Therefore, in the present work, training LAS models is explored to minimize the number of expected word errors (MWER), which significantly improves performance. Second, scheduled sampling (SS) is included, which feeds the previous label prediction during training rather than ground truth. Third, label smoothing helps to make the model less confident in its predictions, and is a regularization mechanism that has successfully been applied in both vision and speech tasks. Fourth, while many models are trained with asynchronous SGD, synchronous training has recently been shown to improve neural systems. These four optimization strategies allow for additional 27.5% relative improvement in WER on top of the described structure improvements.

Finally, a language model can be incorporated to rescore N-best lists in the second pass, which results in a further 3.4% relative improvement in WER. Taken together, the improvements in model structure and optimization, along with second-pass rescoring, improves a single-head attention, grapheme LAS system, from a WER of 9.2% to a WER of 5.6% on a voice search task. This provides a 16% relative reduction in WER compared to a strong conventional model baseline which achieves a WER of 6.7%. Similar trends can be observed on a dictation task. Various descriptions below show how language models can be integrated. Other sections further extend the described model to multi-head attention. As described in more detail below, this document also explores discriminative training and synchronous training regimes, and unidirectional encoders are used for low-latency streaming decoding.

In general, a system is described that provides structure and optimization improvements to a basic LAS model. An example LAS model 100 used for implementing the techniques described in this document comprises three modules as shown in FIG. 1. The listener encoder module 104, which is similar to a standard acoustic model, takes the input features, x, and maps them to a higher-level feature representation, $h^{enc}$. This process of generating an encoded feature representation, $h^{enc}$, can be done for each of multiple input frames, representing different input time steps. These timesteps are denoted with subscript u below. Thus, for a set of frames $\{f_1, f_2, f_3, \ldots f_u\}$ there can be a corresponding set of encoded outputs $\{h_1, h_2, h_3, \ldots h_u\}$.

The output of the encoder 104 is passed to an attender 106, which determines which encoder features in $h^{enc}$ should be attended to in order to predict the next output symbol, similar to a dynamic time warping (DTW) alignment module. In some examples, attender 106 is referred to herein as attender neural network or attention module 106. The attender 106 can generate a context output $c_i$ for each of multiple output steps i. For each context output vector the attender 106 can compute attention based on the encodings for one or more input steps u, e.g., the encoding for the current input step as well as encodings for previous input steps. For example, the attender 106 can generate an attention context output $c_i$ over the set of all the encoder outputs of the utterance, e.g., the entire set $\{h_1, h_2, h_3, \ldots h_u\}$. The attention context vector can be vector representing a weighted summary of the current and previous encodings for frames (e.g., portions) of the utterance being recognized.

Finally, the output of the attender 106 is passed to the decoder 108, which takes the attention context (e.g., a context vector or attention distribution), output by the attender 106, as well as an embedding of the previous prediction, $y_i-1$, in order to produce a decoder output. The decoder output can be a probability distribution, $P(y_i|y_{i-1}, \ldots, y_0, x)$, over the current sub-word unit, $y_i$, given the previous units, $\{y_{i-1}, \ldots, y_0\}$, and input, x. Although not illustrated, the model 100 may include a softmax layer that receives output of the decoder 108. In some implementations, the softmax layer is separate from the decoder 108 and processes the output, $y_i$, from the decoder 108, and the output of the softmax layer is then used in a beam search process to select orthgraphic elements. In some implementations, the softmax layer is integrated with the decoder 108, so that the output $y_i$ of the decoder 108 represents the output of the softmax layer.

The decoder 108 and/or an associated softmax layer may trained to output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the decoder 108 and/or the softmax layer can include a posterior probability value for each of the different output labels. Thus, if there are 100 different output labels representing different graphemes or other symbols, the output $y_i$ of the decoder or the output of a softmax layer that receives and processes the output $y_i$ can include 100 different probability values, one for each output label. The probability distribution can then be used to select and assign scores to candidate orthographic elements (e.g., graphemes, wordpieces, and/or words) in a beam search process for determining the transcription.

In general, attention can be computed using an attention-based LSTM transducer as the attender 106. At every output step, the attender 106 produces a probability distribution over the next character, conditioned on all the characters seen previously. This distribution can be a context vector ci is produced by the attender.

The output distribution $y_i$ is a function of the decoder state $s_i$ and context vector $c_i$. The decoder state $s_i$ is a function of the previous decoder state, $s_{i-1}$, the previously emitted character, $y_{i-1}$, and the previous context vector $c_{i-1}$.

At each time step, i, the attention mechanism generates a context vector, $c_i$, encapsulating the information in the acoustic signal needed to generate the next character. The attention model is content-based, so the contents of the decoder state $s_i$ are matched to the contents of $h_u$ representing time step u of h, to generate an attention vector $\alpha_i$. Then vector $\alpha_i$ is used to linearly blend vectors $h_u$ to create $c_i$.

As an example, at each decoder timestep i, the attention mechanism can compute the scalar energy $e_{i,u}$ for each time step u, using vector $h_u \in h$ and si. The scalar energy $e_{i,u}$ is converted into a probability distribution over time steps (or attention) $\alpha_i$ using a softmax function. This is used to create the context vector $c_i$ by linearly blending the listener features or encoder outputs, $h_u$, at different time steps, for example, using the equations shown below:

$$e_{i,u} = \langle \phi(s_i), \psi(h_u) \rangle$$

$$\alpha_{i,u} = \frac{\exp(e_{i,u})}{\sum_u \exp(e_{i,u})}$$

$$c_i = \sum_u \alpha_{i,u} h_u$$

The structural improvements to the LAS model include the use of word-piece models and multi-headed attention. Regarding word-piece models, traditionally, sequence-to-sequence models have used graphemes (characters) as output units, as this folds the acoustic model, pronunciation model, and language model into one neural network, and side-steps the problem of out-of-vocabulary words. Alternatively, one could use longer units such as word pieces or shorter units such as context-independent phonemes. One of the disadvantages of using phonemes is that it requires having an additional pronunciation model and language model, and was not found to improve over graphemes in some cases.

Typically, word-level LMs have a much lower perplexity compared to grapheme-level LMs. Thus, modeling word pieces can allow for a much stronger decoder LM compared to graphemes. In addition, modeling longer units improves the effective memory of the decoder LSTMs, and allows the model to potentially memorize pronunciations for frequently occurring words. Furthermore, longer units require fewer decoding steps, which can speed up inference in these models significantly. Finally, WPMs have shown good performance for other sequence-to-sequence models such as RNN-T.

The word piece models described in this document are sub-word units, ranging from graphemes all the way up to entire words. Thus, there are no out-of-vocabulary words with word piece models. The word piece models are trained to maximize the language model likelihood over the training set. In some implementations, the word pieces are "position-dependent", in that a special word separator marker is used to denote word boundaries. Words can be segmented deterministically and independent of context, using a greedy algorithm.

Figure 2:
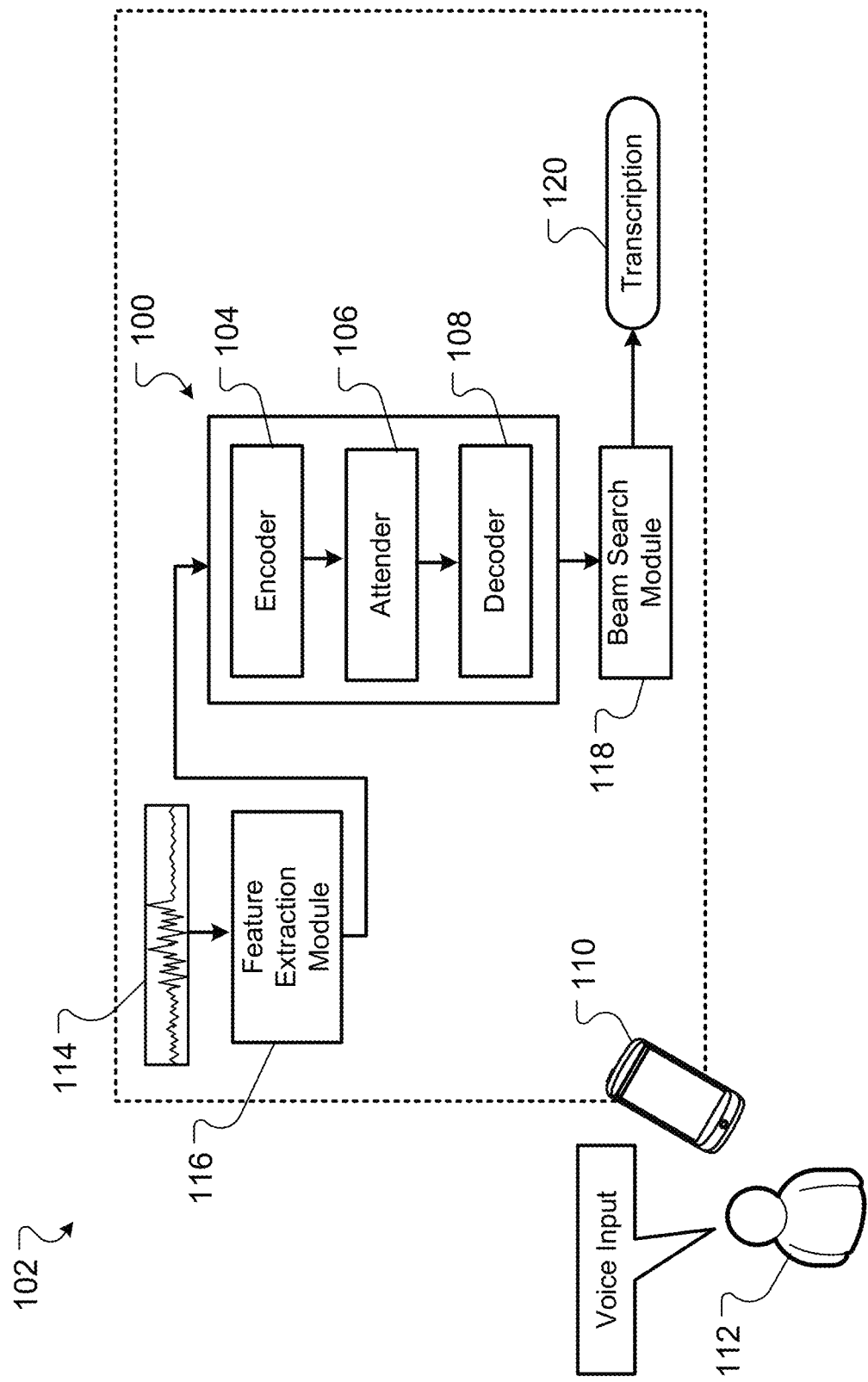
FIG. 2 is a diagram showing an example system for performing speech recognition using the example model of FIG. 1.

FIG. 2 is a diagram showing an example system 102 for performing speech recognition using the model of FIG. 1. In some implementations, system 102 is an example automated speech recognition system. The LAS model 100 of FIG. 1 provides various improvements relative to other speech recognition systems. In the example of FIG. 2, the speech recognition system is implemented using a computing system, such as a user device 110, which stores and uses the improved LAS model 100 to generate a transcription for a voice input.

As shown at FIG. 2, an electronic device stores the modules of LAS model 100. The electronic device 110 receives an utterance from a user 112, such as a voice command.

The utterance may include an utterance of a particular, predetermined hotword that the electronic device 110 is configured to detect and respond to. For example, the electronic device 110 can be configured to wake from a low-power state or to interpret subsequent speech as a voice command in response to detecting utterance of the hotword. In some implementations, the LAS model 100 or another model is used to detect the occurrence of hotwords. In some implementations, a hotword can be a user-defined term or phrase that is changed dynamically based on user preference.

The electronic device 110 has a microphone that detects the utterance from the user and generates audio data 114 representing the utterance spoken by user 112. A feature extraction module 116 processes the audio data 114 to extract (e.g., generate) a set of feature values that are indicative of acoustic characteristics of the utterance. For example, the feature values may be mel-frequency cepstral coefficients. The extracted feature values are provided as inputs to the encoder 104 of the LAS model 100 for mapping to appropriate encoded feature representations. The output of the encoder 104 is processed using the attender 106 to generate an attention distribution. The system 102 generates word element scores using the decoder 108 that receives the attention distribution as an input. The scores indicate likelihoods for a set of word elements. For example, the decoder can provide a probability distribution that indicates posterior probabilities for each of a set of word elements.

Generating the transcription output for the utterance can include using beam search processing to generate one or more candidate transcriptions based on the word element scores. The system 102 also includes a beam search module 118 that performs beam search decoding to generate the candidate transcriptions from which a final transcription 120 is generated as an output of the ASR system 102.

In response to generating the transcription 120 using the LAS model 100, the electronic device 110 can perform any of various actions. For example, the electronic device 110 can analyze the transcription 120 to detect a hotword or command in the utterance received from user 112. In some implementations, the electronic device 110 determines whether one or more predetermined commands are present in the transcription 120, and when the command is identified the electronic device performs an action corresponding to the identified command. For example, the system 102 can identify and execute a particular command (e.g., activate a virtual assistant, play a song, set a timer, add an item to a list, and so on), change an operating mode of the electronic device 110, send the transcription 120 as a request or query to a server, provide search results generated using the transcription 120 as a query, display the transcription 120 of the utterance, or enter the transcription 120 into a text area of a user interface (e.g., during a dictation mode).

Figure 3:
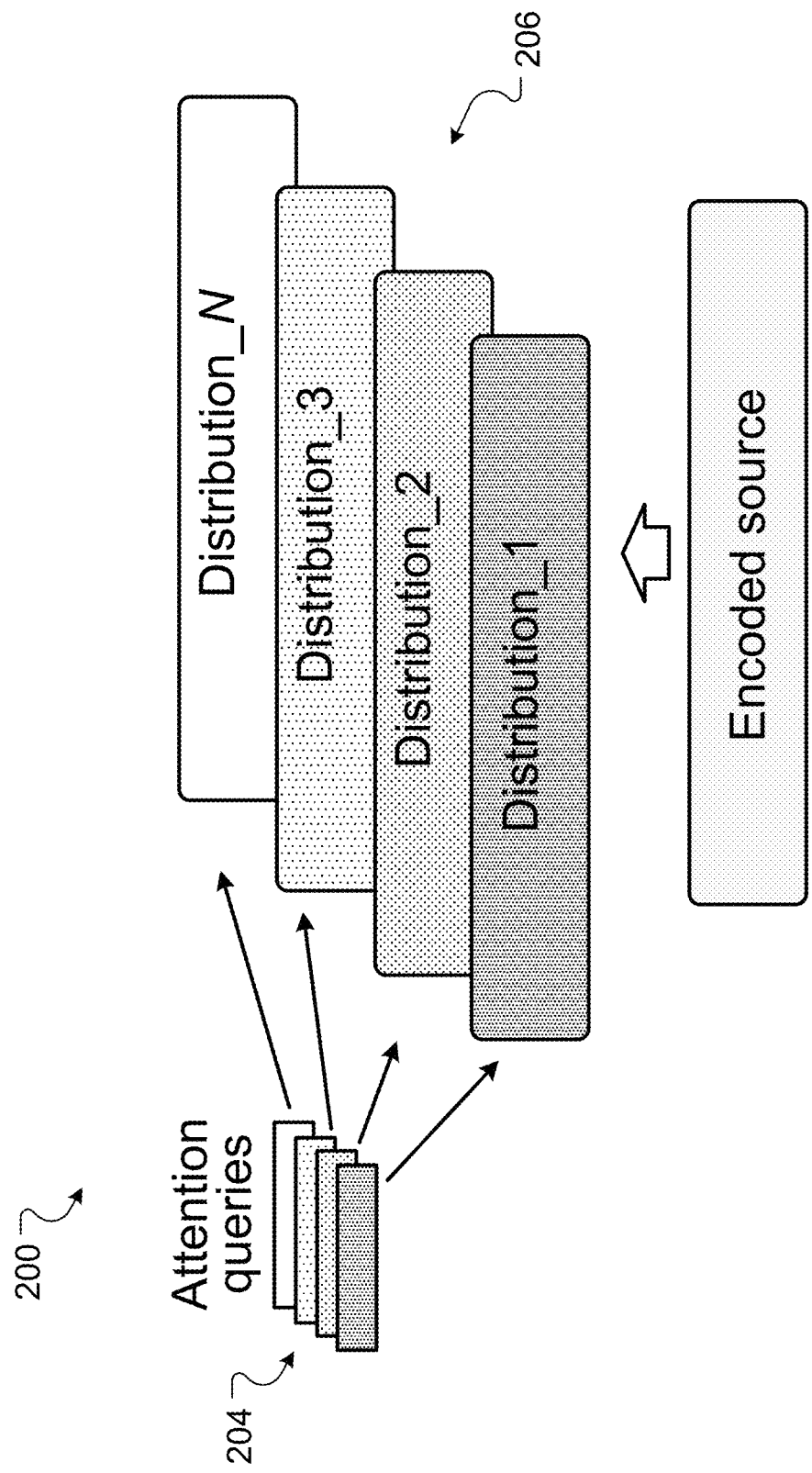
FIG. 3 is a diagram showing a multi-headed attention mechanism associated with the architecture of FIG. 1.

Regarding multi-head attention 200 ("MHA 200"), as shown in FIG. 3, MHA 200 can extend the conventional attention mechanism to have multiple heads 204, where each head can generate a different attention distribution 206. This allows each head to have a different role on attending the encoder output, which can make it easier for the decoder 108 to learn to retrieve information from the encoder 104. In some systems involving single-headed architecture, the model relies more on the encoder 104 to provide clearer signals about the utterances so that the decoder 108 can pick up the information with attention. In some implementations, MHA 200 can reduce the burden on the encoder 104 and can better distinguish speech from noise when the encoded representation is less ideal, for example, in degraded acoustic conditions, such as noisy utterances, or when using uni-directional encoders.

The described optimization improvements include the use of one or more of Minimum Word Error Rate (MWER) Training, scheduled sampling, asynchronous and synchronous training, and label smoothing. These optimizations can be used individually or together in any combination or subcombination.

Regarding MWER training, some ASR systems are often trained to optimize a sequence-level criterion (e.g., state-level minimum Bayes risk (sMBR), in addition to or instead of cross-entropy (CE) and/or connectionist temporal classification (CTC) training). Although the loss function that is optimized for the attention-based systems is a sequence-level loss function, it is not closely related to optimizing the metric that is actually desired or cared about in the speech recognition community, namely, word error rate. A variety of methods have been explored to address this issue in the context of sequence-to-sequence models. In this document, implementations are described that address the minimum expected word error rate (MWER) training for attention-based sequence-to-sequence models.

In the MWER strategy, an objective is to minimize the expected number of word errors. The loss function is given by Equation 1, where the first term denotes the number of word errors of hypotheses y, compared to the ground-truth label sequence, y*. This first term is interpolated with the standard cross-entropy based loss, which can be required in order to stabalize training.

$$\mathcal{L}_{embr} = \mathbb{E}_{P(y|x)}[\text{WordErrors}(y,y^*)] + \lambda \mathcal{L}_{CE} \quad (1)$$

The above expectation can be approximated via sampling or by restricting the summation to an N-best list of decoded hypotheses as is commonly used for sequence training; the latter was found to be more effective in certain implementations.

The computational expression NBest(x, N)={$y_1, \ldots, y_N$}, denotes the set of N-best hypotheses computed using beam-search decoding for the input utterance x. The loss function in Equation 1 can be approximated by weighting the errors made by each hypothesis, WordErrors($y_i$, y*), by the probability P($y_i$|x) concentrated on the hypothesis, as shown at equation 2.

$$\mathcal{L}^s_{mwer} = \frac{1}{N} \sum_{y_i \in \text{NBest}(x,N)} [\text{WordErrors}(y, y^*)] \hat{P}(y_i | x) + \lambda \mathcal{L}_{CE} \quad (2)$$

Here, $\hat{P}(y_i \mid x) = \dfrac{P(y_i \mid x)}{\sum_{y_t \in N\text{Best}(x,N)} P(y_i \mid x)}$, represents the distribution re-normalized over just the N-best hypotheses.

Scheduled sampling can be used when training the decoder. Feeding the ground-truth label as the previous prediction (so-called teacher forcing) can help the decoder to learn quickly at the beginning, but can introduce a mismatch between training and inference. The scheduled sampling process, on the other hand, samples from the probability distribution of the previous prediction (e.g., from the decoder 108 and/or an associated softmax output) and then uses the resulting token to feed as the previous token when predicting the next label. This process helps reduce the gap between training and inference behavior. A training process can use teacher forcing at the beginning of training steps, and as training proceeds, linearly ramp up the probability of sampling from the model's prediction to 0.4 at the specified step, which is then kept constant until the end of training. The step at which one can ramp up the probability to 0.4 is set to 1 million steps and 100,000 steps for asynchronous and synchronous training respectively.

As an example, the use of scheduled sampling during training can involve varying the source for at least one input to the decoder during training, e.g., varying between input data based on ground-truth labels and input data based on a previous prediction of the decoder. The selection of which source provides the input to the decoder for a given training operation can be made at any of various levels of granularity, e.g., for each output time step, for each character or wordpiece, for each word, or for each utterance. In some implementations, a selection for the source of input $y_{i-1}$ is made, in a random or pseudorandom fashion, for each decoder output (e.g., each $y_i$ distribution generated) during training, with the selection being biased according to a predetermined probability. For example, a least one input (e.g., $y_{i-1}$) to the decoder 108 during training is selected between (i) input data based on a known value for an element in a training example (e.g., a generated distribution based on a ground-truth label for the element corresponding to time step i-1), and (ii) input data based on a prediction made using output of the decoder neural network for the element in the training example (e.g., the distribution $y_{i-1}$ actually output by the decoder 108 and/or an associated softmax layer during training for time step i-1).

As an example, a predetermined probability, such as 0.6 or 60%, may be set to bias the selection of the source to provide the input data representing the $y_{i-1}$ distribution to the decoder 108. This probability setting may bias the selection to use the $y_{i-1}$ distribution that is the actual output of the decoder 108 60% of the time, and using a different $y_{i-1}$ distribution determined from the ground-truth label the other 40% of the time. In this manner, the training operations that set the neural network weights of the decoder can intersperse the use of actual predictions from the decoder and forced ground-truth labels. This can improve the robustness of the trained decoder by more closely reflecting the types of inputs received at inference, while increasing accuracy and speeding up training by sometimes using actual ground-truth data as the representation of the prior unit.

As noted above, the probability setting for scheduled sampling can vary over the course of training. For example, at the beginning of training, the training process can use input data for $y_{i-1}$ (e.g., representing the word element in the immediately previous time step) that is mostly or always determined from ground-truth word elements for the time step i-1. As training proceeds, the probability setting can shift to start including decoder predictions of in some training operations, with the frequency or proportion at which decoder predictions are used being increased over time, e.g., gradually, incrementally, with a step increase, or with an increase when a condition occurs.

Both asynchronous and synchronous training are options for training the model. In some implementations, synchronous training can potentially provide faster convergence rates and better model quality, but also requires more effort in order to stabilize network training. Both approaches have a high gradient variance at the beginning of the training when using multiple replicas, and different techniques are explored to reduce this variance. In asynchronous training, a replica ramp up can be used: that is, the system will not start all training replicas at once, but instead start them gradually. In synchronous training, two techniques can be used: learning rate ramp up and a gradient norm tracker. The learning rate ramp up starts with the learning rate at 0 and gradually increases the learning rate, providing a similar effect to replica ramp up. The gradient norm tracker keeps track of the moving average of the gradient norm, and discards gradients with significantly higher variance than the moving average. Both approaches can be required for making synchronous training stable.

Label smoothing is a regularization mechanism to prevent the model from making over-confident predictions. Label smoothing encourages the model to have higher entropy at its prediction, and therefore makes the model more adaptable. In some implementations, the ground-truth label distribution is smoothed with a uniform distribution over all labels.

While the LAS decoder topology is that of neural language model (LM), it can function as a language model; but it is only exposed to training transcripts. An external LM, on the other hand, can leverage large amounts of additional data for which there may be only text (e.g., no audio). To address the potentially weak LM learned by the decoder, this document describes incorporating an external LM during inference only.

For example, the external LM is a large 5-gram LM trained on text data from a variety of domains. Since domains have different predictive value for our LVCSR task, domain-specific LMs are first trained, then combined together using Bayesian-interpolation. The LM can be incorporated in the second-pass by means of log-linear interpolation. In particular, given the N-best hypotheses produced by the LAS model via beam search, the final transcript y* can be determined as:

$$y^* = \arg\max_{y} \log P(y \mid x) + \lambda \log P_{LM}(y) + \gamma \, len(y) \quad (3)$$

In equation 3 above, $P_{LM}$ is provided by the LM, len(y) is the number of words in y, and $\lambda$ and $\gamma$ are tuned on a development set. Using this criterion, transcripts which have a low language model probability will be demoted in the final ranked list. Additionally, the last term addresses the common observation that the incorporation of an LM leads to a higher rate of deletions.

Data was assessed for a ~12,500 hour training set consisting of 15 million English utterances. The training utterances were anonymized and hand-transcribed, and are representative of a search system's voice search traffic. This data set is created by artificially corrupting clean utterances using a room simulator, adding varying degrees of noise and reverberation such that the overall SNR is between 0 dB and 30 dB, with an average SNR of 12 dB. The noise sources can be pulled from a streaming video service platform and daily life noisy environmental recordings. Results are reported on a set of ~14.8K utterances extracted from the search system data traffic, and the resulting model, trained with only voice search data, is evaluated on a set of 15.7K dictation utterances that have longer sentences than the voice search utterances.

Data was also assessed for 80-dimensional log-Mel features, computed with a 25 ms window and shifted every 10 ms. In some implementations, at the current frame, t, these features are stacked with 3 frames to the left and downsampled to a 30 ms frame rate. This downsamples the input sequences and reduces the overall length of frames used to represent an utterance by a factor of three. The encoder network architecture consists of 5 long short-term memory (LSTM) layers. Unidirectional and/or bidirectional LSTMs may be used to implement the encoder, where the unidirectional LSTMs have 1,400 hidden units and bidirectional LSTMs have 1,024 hidden units in each direction (2,048 per layer). Unless otherwise stated, examples are described with reference to unidirectional encoders. Additive attention is used for both single-headed and multi-headed attention examples. Multi-headed attention examples discussed below use 4 heads, although more or fewer may be used, e.g., 2, 3, 6, 8, 10 and so on. The decoder network in the examples below is a 2-layer LSTM with 1,024 hidden units per layer.

Neural networks are trained with the cross-entropy criterion (which is used to initialize MWER training) and are trained using TensorFlow.

For results related to structure improvements, a first set of data assessments explore different structure improvements to the LAS model. Table 1 compares performance for LAS models given graphemes (E1) and WPM (E2). The table indicates that WPM perform slightly better than graphemes. This is consistent with findings which indicate that WPM provides a stronger decoder LM compared to graphemes, resulting in roughly a 2% relative improvement in WER (WERR).

Second, the performance of MHA with WPM are compared, as shown by example E3 in the table. MHA provides around an 11.1% improvement. This indicates that having the model focus on multiple points of attention in the input signal, which is similar in principle to having a language model passed from the encoder, can help significantly. Since models with MHA and WPM can perform best, proposed optimization methods are explored on top of this model in the remainder of this document.

TABLE 1

Impact of word piece models and multi-head attention.

| Exp-ID | Model | WER | WERR |
|---|---|---|---|
| E1 | Grapheme | 9.2 | — |
| E2 | WPM | 9.0 | 2.2% |
| E3 | +MHA | 8.0 | 11.1% |

Referring now to the optimization improvements and related performance as discussed above, table 2 shows that including synchronous training (E4) on top of the WPM+ MHA model provides a 3.8% improvement. Furthermore, including scheduled sampling (E5) gives an additional 7.8% relative improvement in WER; label smoothing gives an additional 5.6% relative improvement. Finally, MWER training provides 13.4%. Overall, the gain from optimizations is around 27.5%, moving the WER from 8.0% to 5.8%.

In some implementations, synchronous training, in the described configuration, yields a better converged optimum at similar amount of training time. Interestingly, while scheduled sampling and minimum word error rate are both discriminative methods, their combination continues to yield additive improvements. Finally, regularization with label smoothing, even with large amounts of data, is proven to be beneficial.

TABLE 2

Sync training, scheduled sampling (SS), label smoothing (LS) and minimum word error rate (MWER) training improvements.

| Exp-ID | Model | WER | WERR |
|---|---|---|---|
| E2 | WPM | 9.0 | — |
| E3 | +MHA | 8.0 | 11.1% |
| E4 | +Sync | 7.7 | 3.8% |
| E5 | +SS | 7.1 | 7.8% |
| E6 | +LS | 6.7 | 5.6% |
| E7 | +MWER | 5.8 | 13.4% |

Next, second-pass rescoring is incorporated into the model. As can be seen in table 3, second-pass rescoring improves the WER by 3.4%, from 5.8% to 5.6%.

TABLE 3

In second pass rescoring, the log-linear combination with larger LM results in a 0.2% WER improvement.

| Exp-ID | Model | WER |
|---|---|---|
| E7 | WPM + MHA + Sync + SS + LS + MWER | 5.8 |
| E8 | +LM | 5.6 |

Having established the improvements from structure, optimization and LM strategies, the gains on a unidirectional and bidirectional systems can now be compared. Table 4 shows that the proposed changes give a 37.8% relative reduction in WER for a unidirectional system, while a slightly smaller improvement of 28.4% for a bidirectional system. This illustrates that most proposed methods offer improvements independent of model topology.

TABLE 4

Both unidirectional and bidirectional models benefit from cumulative improvements.

| Exp-ID | Model | Unidi | Bidi |
|---|---|---|---|
| E2 | WPM | 9.0 | 7.4 |
| E8 | WPM + all | 5.6 | 5.1 |
| WERR | — | 37.8% | 28.4% |

Finally, the proposed LAS model in E8 is compared to a state-of-the-art, discriminatively sequence-trained low frame rate (LFR) system in terms of WER. Table 5 shows the proposed sequence-to-sequence model (E8) offers a 16% and 18% relative improvement in WER over some production systems (E9) on voice search (VS) and dictation (D) task respectively. Furthermore, comparing the size of the first-pass models, the LAS model is around 18 times smaller than the conventional model. In some implementations, the second pass model is 80 GB and still dominates model size.

TABLE 5

Resulting WER on voice search (VS)/dictation (D). The improved LAS outperforms the conventional LFR system while being more compact. Both models use second-pass rescoring.

| Exp-ID | Model | VS/D | 1st pass Model Size |
|---|---|---|---|
| E8 | Proposed | 5.6/4.1 | 0.4 GB |
| E9 | Conventional LFR system | 6.7/5.0 | 0.1 GB (AM) + 2.2 GB (PM) + 4.9 GB (LM) = 7.2 GB |

As discussed above, an attention-based model can be designed for sequence-to-sequence speech recognition. The model integrates acoustic, pronunciation, and language models into a single neural network, and does not require a lexicon or a separate text normalization component. Various structure and optimization mechanisms are explored for improving the model. Cumulatively, structure improvements (WPM, MHA) yielded an 11% improvement in WER, while optimization improvements (MWER, SS, LS and synchronous training) yielded a further 27.5% improvement, and the language model rescoring yielded another 3.4% improvement. Applied on an example voice search task (e.g., using Google Voice Search), a WER of 5.6% is achieved, while a hybrid HMM-LSTM system achieves 6.7% WER. When the same models are tested on a dictation task, the described model achieves 4.1% and the hybrid system achieves 5% WER.

In some implementations, the unidirectional LAS system has the limitation that the entire utterance must be seen by the encoder, before any labels can be decoded, although the utterance can nevertheless be encoded in a streaming fashion. To address this limitation, the described model can be revised with a streaming attention-based model, such as Neural Transducer. In addition, or as an alternative, the limitation may be addressed by training the attention-based model to operate on segments of an utterance less than the full utterance. For example, a "chunk"-based approach may process attention on small segments of the utterance, such as a certain number of frames or a certain duration of the utterance at a time. The model may shift attention from one chunk to the next to limit the amount of latency incurred. As a result, the attention mechanism can provide outputs to the decoder allowing a transcription of a first chunk or segment of an utterance while a second chunk or segment of the utterance is still being spoken.

As noted above, in the context of speech recognition and sequence-to-sequence models, FIGS. 1-2 have illustrated techniques for improving LAS models. The remaining FIGS. 3-4 describe techniques for improving NT model performance, particularly with regard to streaming applications.

Sequence-to-sequence models have become popular in the automatic speech recognition (ASR) community. The popularity can be associated with these models allowing for one neural network to jointly learn an acoustic, pronunciation and language model, which greatly simplifies the ASR pipeline. This document describes some aspects of attention-based sequence-to-sequence models. In some implementations, these models have been shown to perform better than alternatives, such as Connectionist Temporal Classification (CTC) and Recurrent Neural Network Transducer (RNN-T).

As discussed above with reference to FIG. 1, attention-based models consist of three modules. First, an encoder module, represented by a multi-layer recurrent neural network (RNN), models the acoustics. Second, a decoder module, which consists of multiple RNN layers, predicts the output sub-word unit sequence. Third, an attention layer module selects frames in the encoder representation that the decoder should attend to when predicting each sub-word unit. Attention-based models, such as Listen, Attend and Spell (LAS) can be explored in "full-sequence" mode, meaning attention is computed by seeing the entire input sequence. Thus, during inference, the model can produce the first output token only after all input speech frames have been consumed. While such a mode of operation might be suitable for many applications, these models tend to not be suitable for "streaming" speech recognition, such as voice search, where the output text should be generated as soon as possible after words are spoken. Recently, neural transducer (NT) was proposed as a limited-sequence streaming attention-based model, which consumes a fixed number of input frames (a chunk), and outputs a variable number of labels before it consumes the next chunk. While NT models are attractive for streaming applications, NT models have also shown performance degradation over other online sequence-to-sequence models, such as RNN-T and full-sequence unidirectional attention-based models, particularly as the chunk-size was decreased.

To remedy these challenges, this document describes enhancements to the streaming NT model—both in terms of model structure, as well as in the training procedure—that are aimed at improving the model's performance to be as close as possible to the non-streaming full-sequence unidirectional LAS model, which serves as an upper-bound. In some implementations, streaming can be considered to mean that the system has a maximum allowable delay of 300 ms. Regarding the enhancements to the NT model, attention in the model is computed looking back many previous chunks. This method of computing attention does not introduce additional latency. Further, allowing the model to look-ahead by five frames can also be beneficial for improving performance.

In some implementations, an NT model is initialized from a pre-trained LAS model, which can be a more effective strategy than having the model learn from scratch. In some implementations, when the NT model is used to conduct a 12,500 hour voice search task, with look-back and look-ahead, NT is more than 20% relative worse than LAS in terms of word error rate (WER). However, by pre-training the NT model with LAS, NT with a chunk size of 10 (450 ms latency) matches the performance of LAS, but a chunk size of five (300 ms latency) still degrades performance by 3% relative. This analysis of the NT model indicates that many of the errors that result when compared to LAS are language modeling (LM) errors. Incorporating a stronger language model (LM) into the NT model, to allow for a reduced chunk size helps to mitigate the LM errors. In some implementations, a LM is incorporated from the encoder side via multi-head attention. The NT model is trained with word pieces to get a stronger LM into the decoder and an external LM is explicitly incorporated via shallow fusion. Using these methods, an NT system with a chunk size of five (300 ms latency) only degrades performance by 1% relative to a unidirectional LAS system.

Figure 4:
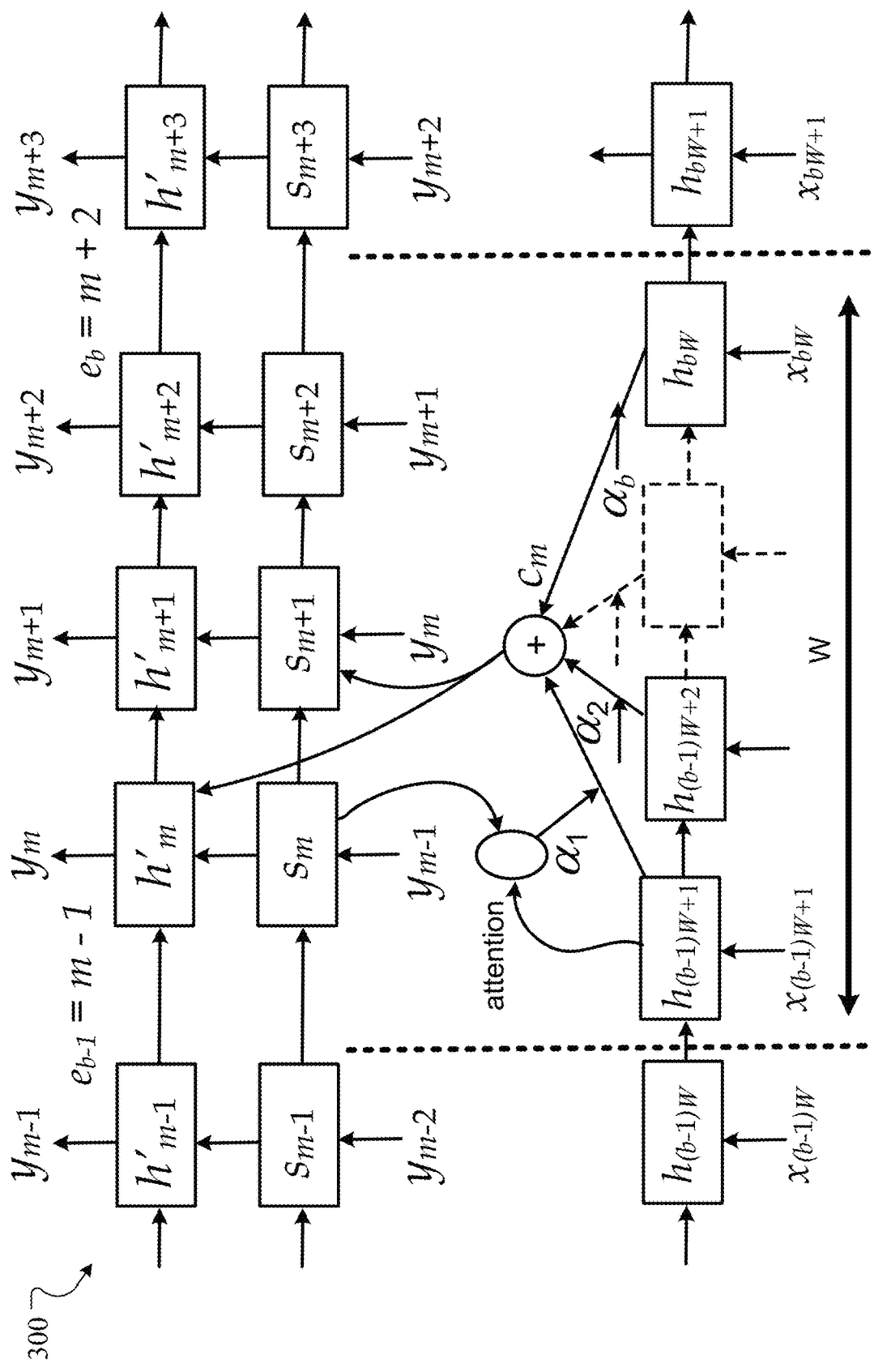
FIG. 4 is a diagram of an example neural transducer attention model.

FIG. 4 is a diagram of an example neural transducer (NT) attention model 300. Given an input sequence of frame-level features (e.g., log-mel-filter bank energies), $x = \{x1, x2, \ldots, xT\}$, and an output sequence of sub-word units (e.g., graphemes, or phonemes) $y = \{y1, y2 \ldots yN\}$, attention models assume that the probability distribution of each sub-word unit is conditioned on the previous history of sub-word unit predictions, $y<i$, and the input signal. Full-sequence attention models such as LAS compute the probability of the output prediction y<i for each step i given the entire input acoustic sequence x, making it unsuitable for streaming recognition applications. As used herein, an NT model is a limited-sequence attention model that addresses this issue by limiting attention to fixed-size blocks of the encoder space.

Given the input sequence, x, of length T, and a block size of length W, the input sequence is divided equally into blocks of length B=[T/W], except for the last block which might contain fewer than B frames. The NT model examines each block in turn, starting with the left-most block (i.e., the earliest frames). In this model, attention is computed over the frames in each block. Within a block, the NT model produces a sequence of k outputs, $y_i, \ldots, y_i+k$. In some implementations, it may be useful to limit the maximum number of outputs that can be produced within a block to M symbols, so that $0 \leq k \leq M$. Once all of the required labels within a block are produced, the model outputs an <epsilon> symbol, which signifies the end of block processing. The model then proceeds to compute attention over the next block, and other subsequent blocks, until all blocks have been processed. The <epsilon> symbol is analogous to the blank symbol in connectionist temporal classification (CTC). In some implementations, a block outputs a minimum of one symbol (<epsilon>), before proceeding to the next block.

The model computes $P(y_1, \ldots, (s+B)|x1 \ldots T)$, which outputs a sequence which is length B longer than the LAS model since the model must produce an <epsilon> at every block. Within each block b E B, the model computes the probability indicated at Equation 4 where $y_{eb}$=<epsilon> is the symbol at the end of each block. In other words, the prediction $y_i$ at the current step, i, is based on the previous predictions $y_1 \ldots e_{(i-1)}$, similar to LAS, but in this case using acoustic evidence only up to the current block $x_{1 \ldots bW}$:

$$P(y(e_{b-1}+1)_{\ldots e_b} | x_{1\ldots bW}, y_{1\ldots e_{b-1}}) = \prod_{i=\epsilon_{(b-1)}}^{\epsilon_b} P(y_i | x_{1\ldots bW}, y_{1\ldots e_{(i-1)}}) \quad (4)$$

Like LAS, NT also consists of a listener, an attender and a speller to define a probability distribution over the next sub-word unit conditioned on the acoustics and the sequence of previous predictions. The listener module of the NT computes an encoding vector in the current block only:

$$h_{(b-1)W+1 \ldots bW} = \text{Listen}(x_{(b-1)W+1 \ldots bW}) \quad (5)$$

which is implemented as a unidirectional RNN. The goal of the attender and speller is to take the output of the listener (i.e., h) and produce a probability distribution over sub-word units. The attention and speller modules operate similar to LAS, but only work on the partial output, $h_{1 \ldots bW}$, of the encoder up until the current block.

As noted above, this document describes methods for achieving improvements in the performance of NT models. In this context, techniques are described for realizing various improvements to an example NT algorithm and corresponding NT model. For example, improving the algorithm and model can involve training grapheme-based models using word alignments. In some implementations, training with NT requires knowing which sub-word units occur in each chunk, and thus an alignment is needed to discern the occurrence of the sub-word units relative to each chunk. In some instances, training with NT is accomplished using context-independent phonemes, for which an alignment was available. NT can also trained with graphemes which do not have an alignment. However, for word level alignments, information can be used to emit all graphemes in the chunk corresponding to when a word has finished.

Improving the algorithm and model can also involve extending the attention range. For example, with some NT models, attention can be computed by only looking at encoder features in the current block b, as shown in Equation 5. However, making the attention window longer allows NT to approach the performance of LAS, but at the cost of removing the online nature of the task. However, a streaming online system can still be maintained by computing attention by looking back over k previously blocks. This is particularly relevant because graphemes are emitted at word boundaries. Furthermore, some streaming systems can be configured to allow a look ahead of 150 ms (five 30-ms frames) between the input frames and the output prediction. With these changes, the listener is now shown by Equation 6.

$$h_{(b-1)W+1 \ldots bW} = \text{Listen}(x_{(b-k)W+1 \ldots bW+5}) \quad (6)$$

Improving the algorithm and model can also involve pre-training with LAS. Attention-based models learn an alignment (represented via an attention vector), jointly with the acoustic model (encoder) and language model (decoder). NT models may experience lagging behind LAS because, during training, the attention mechanism is limited in the window over which it can compute attention. This lagging can be exacerbated when graphemes are emitted only at word boundaries. However, based on attention plots in LAS, once the attention mechanism is learned, it appears to be fairly monotonic. Since NT and LAS can be parameterized substantially (or exactly) the same (except for an extra <epsilon> output target), a LAS model can be trained with this extra target (which is ignored because it does not appear in the LAS target sequence) and which can be used to initialize NT. Also, since LAS learns an attention mechanism that is relatively monotonic, it can be used to initialize NT so that NT does not take a large hit in accuracy compared to LAS.

Improving the algorithm and model can also involve incorporating a stronger language model. As chunk-sizes are reduced, or made smaller, most of the errors that occur with the NT model can be due to language modeling errors. Therefore, incorporating a stronger LM into the decoding and/or training process can lead to performance improvements. For example, to increase the memory and linguistic span of the decoder, wordpieces are emitted instead of graphemes. In this approach, words are broken up, deterministically, into sub-word units, called wordpieces. For instance, the phrase "Jet makers feud" can be broken up into "-J," "et," "-makers," "-fe," "ud," where some words may be broken down into sub-units (e.g., the words "Jet" and "feud") while common words (e.g., "makers") are modeled as a single unit. In some implementations, wordpieces are position-dependent, so the beginning of each word can be marked with a special marker "-". A wordpiece inventory is trained to maximize the likelihood of the training text. Wordpieces achieve a balance between the flexibility of characters and efficiency of words. Sequence-to-sequence models that predict wordpieces can be successful in both machine translation and speech. Since these models are trained to predict wordpieces, rather than graphemes, a much stronger decoder LM is used. In some implementations, predicting wordpieces can result in reduced chunk size as well with NT.

Incorporating a stronger language model can involve incorporating external language models. In some implementations, language models are incorporated into sequence-to-sequence models to guide a beam search to output a more likely set of candidates. As described herein, incorporating an external LM into the beam search can help to improve performance of an NT model. For example, a log-linear interpolation can be done between the LAS model and a finite-state transducer (FST)-based LM trained to go from graphemes to words at each step of the beam search, also known as shallow fusion. In equation 7 below, p(y|x) is the score from the LAS model, which is combined with a score coming from an external LM $p_{LM}(x)$ weighted by an LM weight $\lambda$, and a coverage term to promote longer transcripts and weighted by $\eta$.

$$y^* = \arg\min_{y} - \log P(y|x) - \lambda \log p_{LM}(x) - \eta coverage \quad (7)$$

In some implementations, a ~12,500 hour training set consisting of 15 million English utterances is used to evaluate NT performance when the described improvement techniques are used. During evaluation, the training utterances are anonymized, are hand-transcribed, and are representative of voice search traffic received by an example system (e.g., a search system). This training data set can be created by artificially corrupting clean utterances using a room simulator, which adds varying degrees of noise and reverberation such that the overall SNR is between 0 dB and 30 dB, with an average SNR of 12 dB. The noise sources are from daily life noisy environmental recordings. Evaluation results are reported on a set of ~14,800 anonymized, hand-transcribed voice search utterances extracted from the search traffic. In some implementations, the evaluations use 80-dimensional log-mel features, computed with a 25-ms window and shifted every 10 ms. At a current frame, t, these features are stacked with two frames to the left and downsampled to a 30 ms frame rate. The encoder network architecture can include five unidirectional long short-term memory (LSTM) layers. Additive attention can be used for the evaluations. The decoder network is a two layer LSTM with 1,024 hidden units per layer. The networks are trained to predict 74 graphemes unless otherwise noted. All neural networks are trained with the cross-entropy criterion, using asynchronous stochastic gradient descent (ASGD) optimization with Adam and are trained using TensorFlow.

Aspects of getting NT to work online are also described herein. For the attention window, the behavior of NT is analyzed as the window used to compute attention is varied. An encoder is used which includes five layers of 768 uni-directional LSTM cells and a decoder with two layers of 768 LSTM cells. As shown in Table 6 when the NT model is only allowed to compute attention within a chunk of size 10, performance is roughly 25% worse in terms of WER compared to the LAS model, which differs only in the window over which attention is computed. Allowing the model to compute attention over the last 20 chunks in addition to the current chunk, however, slightly improves performance of the NT system. If a five frame look-ahead is allowed, performance is improved but NT is still roughly 13% relative worse compared to LAS. In some implementations, the five frame look-ahead with a chunk size of 10 is not the same as a 15 frame window. This is because the five frame look ahead is with respect to the end of the chunk boundary, and all other frames used to compute attention occur before the chunk boundary. Based on the results in Table 6 since the proposed changes improve performance, future NT results described herein use a look-back of 20 chunks and a look-ahead of five frames.

TABLE 6

WER for NT, Varying Chunks Looked Over

| System | Chunk Size | WER |
|---|---|---|
| LAS | — | 11.7 |
| NT attention within Chunk | 10 | 14.6 |
| NT, look back | 10 | 14.4 |
| +look ahead | 10 | 13.2 |

For initialization from LAS and single-head attention, the behavior of NT is analyzed, for both a chunk size of 5 and 10, when NT is pre-trained with LAS. For these evaluations, two different encoder/decoder sizes are compared. Table 7 shows that when NT is pre-trained with LAS, at a chunk size of 10 (i.e., 450 ms latency) the performance of LAS can be matched. However, a chunk size of five (300 ms latency) still lags behind LAS by 3% relative for the larger model. In some implementations, a chunk size of 5 (300 ms latency) is the requirement for allowed streaming delay.

TABLE 7

WER for NT, Pretrained from LAS

| System | Chunk | 5 × 768<br>2 × 768 | 5 × 1024<br>2 × 1024 |
|---|---|---|---|
| LAS | — | 11.7 | 9.8 |
| NT, scratch | 10 | 13.2 | 11.1 |
| NT, pretrained | 10 | 11.4 | 9.9 |
| NT, scratch | 5 | — | 14.5 |
| NT, pretrained | 5 | — | 10.1 |

For initialization from LAS, the behavior of LAS vs. NT is compared when the system uses multi-head attention (MHA), which can give state-of-the-art ASR performance for LAS. A MHA model uses a 5×1400 encoder, with four attention heads, and a 2×1024 decoder.

TABLE 8

Representative errors made by different systems, indicated bold

| LAS, MHA | NT-Ch5, MHA | NT-Ch5, MHA, WPM |
|---|---|---|
| school closing in parma for tomorrow | what closing in parma for tomorrow | school closing in parma for tomorrow |
| how to multiply two numbers with decimals | how to multiply two numbers with this most | how to multiply two numbers with decimals |
| how far is it from albuquerque new mexico to fountain hills arizona | how far is it from albuquerque new mexico to to fountain hills arizona | how far is it from albuquerque new mexico to fountain hills arizona |
| is under the arm warmer or colder than in mouth temperature | is under the arm warmer or colder than a mouse temperature | is under the arm warmer or colder than in mouth temperature |

Table 9 shows that the performance of NT does not improve from single to multi-head attention, even though the LAS system does. This may occur because multi-head attention computes attention from multiple points in the encoder space that come after the current prediction, which are ignored by streaming models such as NT.

TABLE 9

WER for NT with MHA

| System | Chunk | Single Attention-WER 5 × 1024,2 × 1024 | MHA-WER 5 × 1400,2 × 1024 |
|---|---|---|---|
| LAS | — | 9.8 | 8.0 |
| NT | 10 | 9.9 | 9.8 |
| NT | 5 | 10.1 | 10.3 |

To understand the loss in performance caused by NT compared to LAS, sentences are analyzed where LAS was correct and NT was incorrect, as denoted in the first two columns of Table 8 as "LAS-MHA" and "NT-Ch5,MHA." Table 9 indicates that most of the NT errors are due to language modeling errors. In this context, methods for incorporating a LM into the system are described in more detail below.

Figure 5:
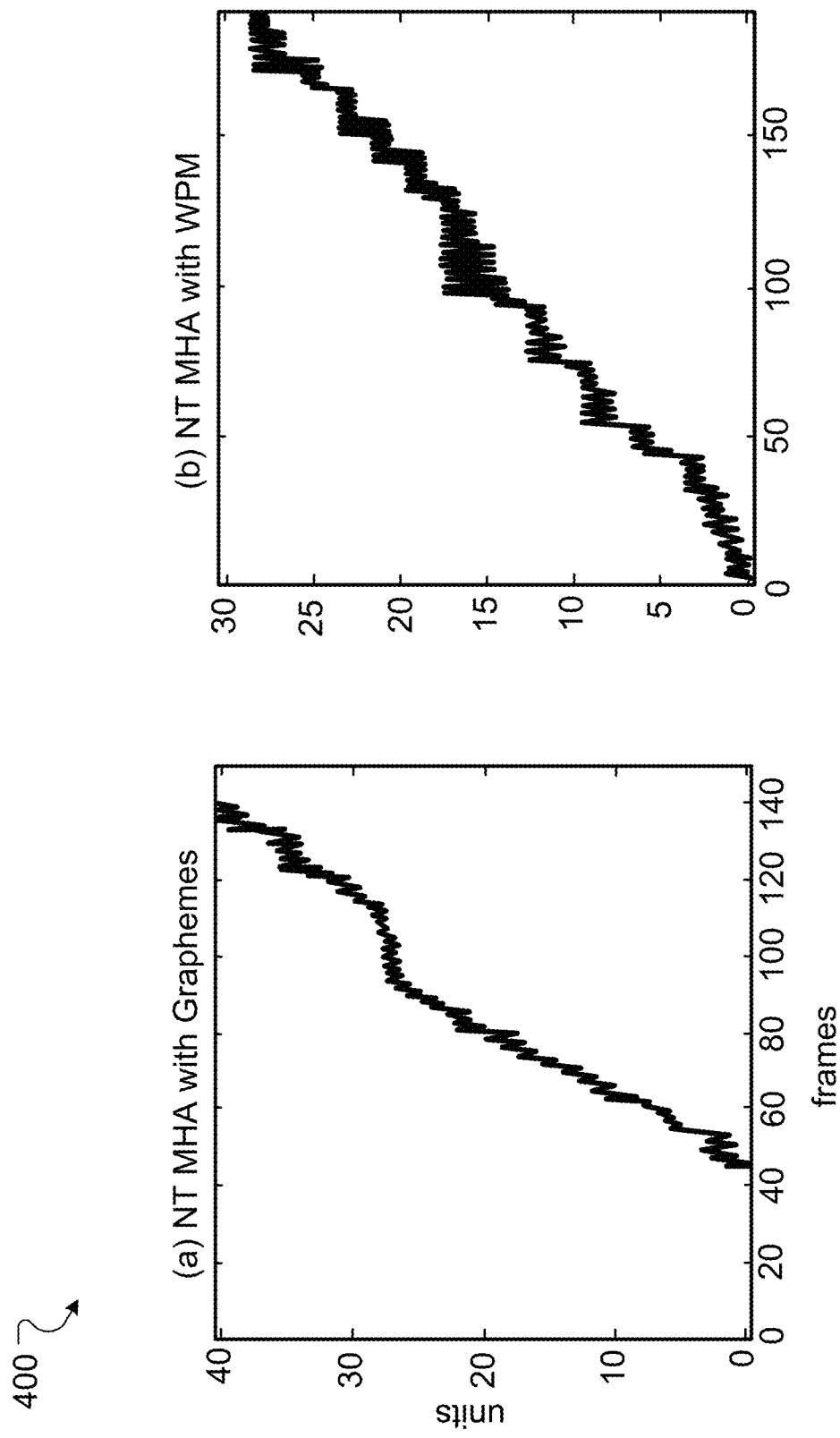
FIG. 5 shows graphical data representing attention plots for a grapheme vs. wordpiece system.

Incorporating the LM can involve using wordpieces. For example, wordpieces can be incorporated into the LAS and NT models, which provide a stronger LM from the decoder side. In some implementations, 32,000 wordpieces can be incorporated to evaluate model performance. Table 10 shows that with wordpieces, the NT and LAS models are much closer compared to when graphemes are used. In addition, there is very little difference in performance between NT with a chunk size of five and NT with a chunk size of 10. This may occur because since wordpieces are now longer units, each attention head focused on by a neural transducer corresponds to a much longer sub-word unit (potentially a word) compared to the NT grapheme MHA system. Therefore, the MHA wordpiece model (WPM) feeds a much stronger set of context vectors to the decoder compared to NT grapheme model. This can also be visually observed by referencing the attention plots 400 for the grapheme vs. wordpiece systems shown at FIG. 5 The attention plots 400 include respective plots for NT-MHA with (a) Graphemes and (b) WPM. The respective attention plots (a) and (b) in FIG. 5 also correspond to different utterances. Further, the attention plots 400 show that the attention vectors for wordpieces span a much longer left context window compared to graphemes.

TABLE 10

WER for NT with MHA + WPM

| System | Chunk | WER |
|---|---|---|
| LAS | — | 8.6 |
| NT | 10 | 8.6 |
| NT | 5 | 8.7 |

In some implementations, an external LM is incorporated into the MHA+WPM LAS and NT models. Incorporating the external LM can involve using an n-gram FST LM that is trained on 32K wordpieces. This LM is trained on 1 billion text queries, a much larger set compared to the 15 million utterances seen by the LAS/NT models. Table 11 below shows that the FST LM does not provide additional improvement for both NT and LAS. In some implementations, the perplexity of a WPM RNN-LM is much lower than a WPM FST. Since the decoder of the LAS and NT models is an RNN-LM, it is possible there is nothing more to gain by incorporating the WPM FST. In other implementations, these processes can be repeated with a WPM RNN-LM trained on text data.

TABLE 11

WER for NT, Incorporating External LM

| System | Chunk | No LM | with LM |
|---|---|---|---|
| LAS | — | 8.6 | 8.6 |
| NT | 10 | 8.6 | 8.6 |
| NT | 5 | 8.7 | 8.7 |

After including both WPM and external LM, the last column of Table 8 namely, "NT-Ch5, MHA, WPM," illustrates that many of the previous sentences are now fixed and match the LAS performance. With these proposed LM improvements, NT models with a chunk size of five have comparable performance to LAS, while meeting the allowable delay of 300 ms. As indicated above, techniques have been described for achieving various improvements to NT model performance (e.g., for streaming applications). Specifically, the described techniques improve performance by increasing the attention window and pre-training NT with LAS. With these improvements, a single-head NT model can come very close to the performance of LAS, while a multi-head attention NT model may be degraded over LAS. In some implementations, multi-head NT models effectively match the performance of LAS when a stronger LM is incorporated through wordpieces.

Figure 6:
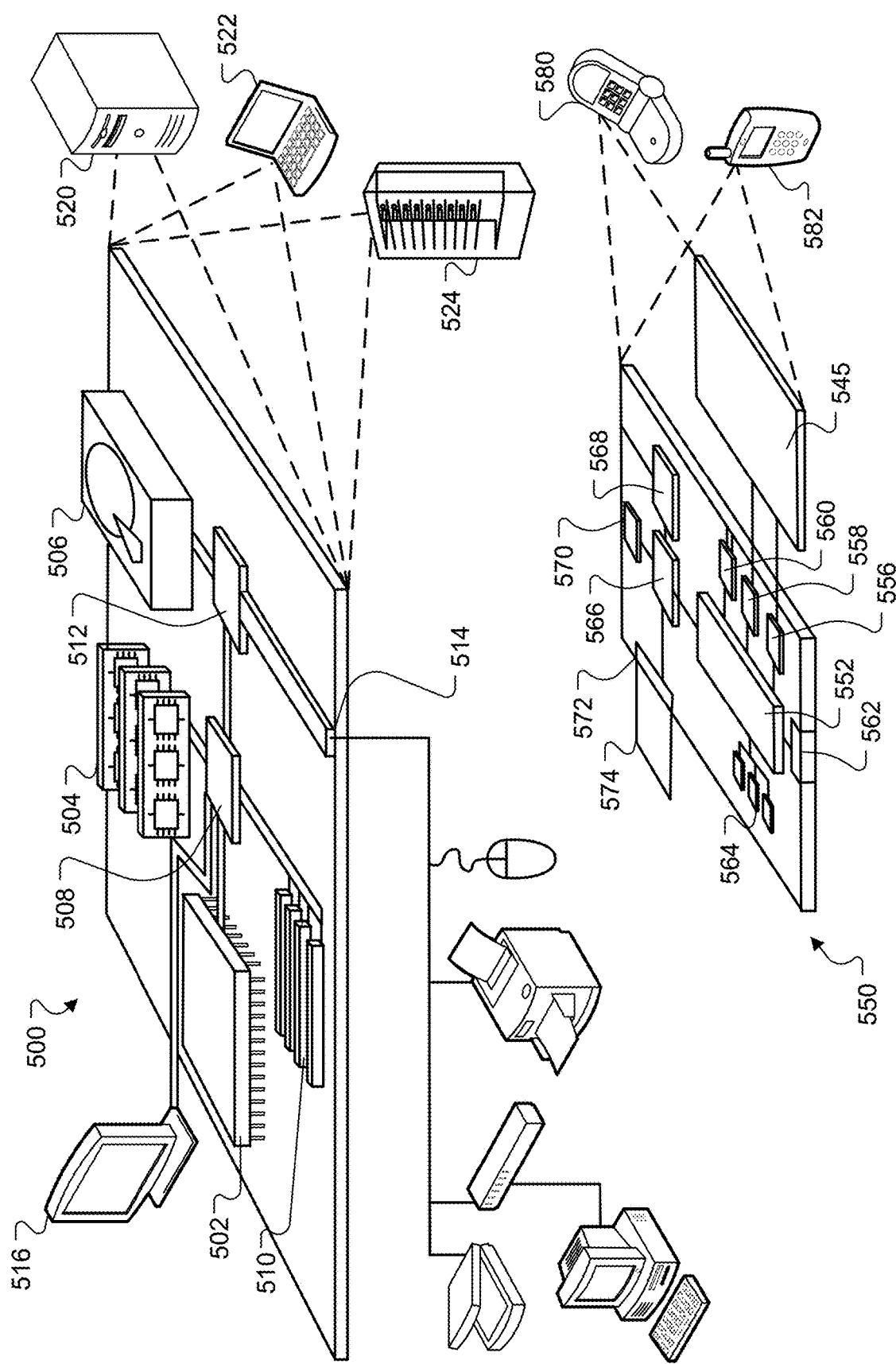
FIG. 6 is a block diagram of a computing system that can be used in connection with computer-implemented methods described in this document.

FIG. 6 is a block diagram of computing devices 500, 550 and systems and methods described in this document may be used to implement these devices, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface.

Such expansion memory 574 may provide extra storage space for device 550, or may also store applications or other information for device 550. For example, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550. The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers of an automated speech recognition system, the method comprising:
receiving audio data for an utterance;
providing features indicative of acoustic characteristics of the utterance as input to an encoder neural network;
processing an output of the encoder neural network using an attender neural network to generate a context vector;
generating speech recognition scores using the context vector and a decoder neural network, wherein the decoder neural network has been trained using a training process that selects at least one input to the decoder neural network with a predetermined probability, wherein the at least one input to the decoder neural network during training is selected between (i) input data based on a known value for an element in a training example, and (ii) input data based on an output of the decoder neural network for the element in the training example;
generating a transcription for the utterance using word elements selected based on the speech recognition scores; and
providing the transcription as an output of the automated speech recognition system.

2. The method of claim 1, wherein the element in the training example is an element for a most-recent previous output time step, wherein the known value is a ground-truth output label for the element in the training example, and wherein the prediction for the element in the training example is an output label predicted using output of the decoder neural network for a most-recent previous output time step.

3. The method of claim 1, wherein the context vector is a weighted sum of multiple encoder outputs for the utterance.

4. The method of claim 1, wherein the attender neural network has multiple different network components that each receive the output of the encoder neural network.

5. The method of claim 1, wherein the decoder neural network is configured to generate word element scores indicating likelihoods for a set of word elements that includes individual graphemes.

6. The method of claim 1, wherein the set of word elements for which the decoder neural network is configured to generate word element scores further includes partial words that include multiple graphemes or whole words.

7. The method of claim 1, wherein the attender neural network implements a multi-headed attention mechanism that generates multiple attention distributions; and
wherein each of the multiple different network components of the attender neural network separately receives and processes the output of the encoder neural network to independently generate one of the multiple attention distributions.

8. The method of claim 7, wherein processing the output of the encoder neural network using the attender neural network to generate the attention distribution comprises:
normalizing each of the multiple attention distributions determined by the multiple different network components of the attender neural network; and
averaging the normalized distributions to generate the attention distribution of the attender neural network that is processed by the decoder neural network.

9. The method of claim 7, wherein each of the multiple different network components of the attender neural network receives an entire set of outputs of the encoder neural network as an input, and each of the multiple different network components of the attender neural network applies a different set of weights to the output of the encoder neural network.

10. The method of claim 1, wherein the attention distribution has a lower dimensionality than the output of the encoder neural network.

11. The method of claim 1, wherein the decoder neural network is a recurrent neural network comprising long short-term memory (LSTM) elements.

12. The method of claim 1, wherein generating the transcription for the utterance comprises using beam search processing to generate one or more candidate transcriptions based on the word element scores.

13. The method of claim 12, wherein generating a transcription for the utterance comprises:
generating language model scores for the multiple candidate transcriptions using a language model; and
determining the transcription based on the language model scores generated using the language model.

14. The method of claim 13, wherein generating language model scores for the multiple candidate transcriptions comprises determining the language model scores using a plurality of domain-specific language models that are combined using Bayesian interpolation.

15. The method of claim 14, wherein determining the transcription based on the language model scores generated using the language model comprises generating a combined score that represents a log-linear interpolation of scores based on the output of the decoder neural network and the language model scores determined using the language model.

16. The method of claim 15, wherein the combined score for a candidate transcription is further based on a scoring factor based on the number of words in the candidate transcription and an empirically tuned coefficient.

17. The method of claim 1, wherein the decoder neural network comprises a unidirectional LSTM neural network;
wherein providing features indicative of acoustic characteristics of the utterance as input to an encoder neural network comprises providing a series of features vectors that represents the entire utterance, the encoder neural network being configured to generate output encodings in a streaming manner as the feature vectors are input; and
wherein generating word element scores using a decoder neural network comprises beginning decoding of word elements representing the utterance after the encoder neural network has completed generating output encodings for each of the feature vectors in the series of features vectors that represents the entire utterance.

18. One or more non-transitory machine-readable storage media storing instructions that are executable by one or more processing devices to cause performance of operations comprising:
receiving audio data for an utterance;
providing features indicative of acoustic characteristics of the utterance as input to an encoder neural network;
processing an output of the encoder neural network using an attender neural network to generate a context vector;
generating speech recognition scores using the context vector and a decoder neural network, wherein the decoder neural network has been trained using a training process that selects at least one input to the decoder neural network with a predetermined probability, wherein the at least one input to the decoder neural network during training is selected between (i) input data based on a known value for an element in a training example, and (ii) input data based on an output of the decoder neural network for the element in the training example;
generating a transcription for the utterance using word elements selected based on the speech recognition scores; and
providing the transcription as an output of an automated speech recognition system.

19. The non-transitory machine-readable storage media of claim 18, wherein the element in the training example is an element for a most-recent previous output time step, wherein the known value is a ground-truth output label for the element in the training example, and wherein the prediction for the element in the training example is an output label predicted using output of the decoder neural network for a most-recent previous output time step.

20. An automated speech recognition system comprising:
one or more processing devices; and
one or more non-transitory machine-readable storage media storing instructions that are executable by the one or more processing devices to cause performance of operations comprising:
receiving audio data for an utterance;
providing features indicative of acoustic characteristics of the utterance as input to an encoder neural network;
processing an output of the encoder neural network using an attender neural network to generate a context vector;
generating speech recognition scores using the context vector and a decoder neural network, wherein the decoder neural network has been trained using a training process that selects at least one input to the decoder neural network with a predetermined probability, wherein the at least one input to the decoder neural network during training is selected between (i) input data based on a known value for an element in a training example, and (ii) input data based on an output of the decoder neural network for the element in the training example;

generating a transcription for the utterance using word elements selected based on the speech recognition scores; and providing the transcription as an output of the automated speech recognition system.

\* \* \* \* \*